United States Patent Office

2,713,593
Patented July 19, 1955

2,713,593

FLUOROCARBON ACIDS AND DERIVATIVES

Thomas J. Brice, St. Paul, Wilbur H. Pearlson, White Bear Township, Ramsey County, and Harold M. Scholberg, St. Paul, Minn., assignors to Minnesota Mining & Manufacturing Company, St. Paul, Minn., a corporation of Delaware No Drawing. Application December 21, 1953, Serial No. 399,574

6 Claims. (Cl. 260—535)

This application relates to our discovery of a new and useful class of fluorocarbon acids and derivatives.

These novel compounds are the normal (straight chain) perfluoro(alkoxypropionic) acids having 4 to 11 carbon atoms in the molecule; the acid halide derivatives thereof; the metal and ammonium salt derivatives thereof; and the alkyl ester derivatives thereof. These compounds can be represented by the equivalent generic formulae:

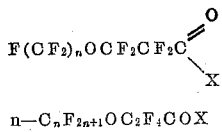

$$n\text{—}C_nF_{2n+1}OC_2F_4COX$$

where the subscript $n$ has an integer value of 1 to 8; and "X" stands for the hydroxyl group (OH) in the acids, for the halide atom (F, Cl, Br or I) in the acid halides, for the salt group (OM) in the metal and ammonium salts ("M" standing for the metal atom or ammonium group), and for the alkoxy group (OR) in the alkyl esters ("R" standing for an alkyl group, such as methyl, ethyl, propyl, butyl, amyl, hexyl, etc.).

These compounds differ in structure and composition from the normal perfluoroalkyl monocarboxylic acids, $F(CF_2)_mCOOH$, and corresponding derivatives, containing an uninterrupted terminal chain of 3 or more fully fluorinated carbon atoms directly attached to the carbonyl group (cf. U. S. Patent No. 2,567,011), in that the present compounds contain an ether oxygen atom within the fluorocarbon chain. The position of this intermediate oxygen atom is of critical importance. It will be noted from the above formulas that this oxygen atom links together the second (beta) and third (gamma) fluorinated carbon atoms.

The present acids may be regarded as derivatives of perfluoropropionic acid wherein a terminal fluorine atom has been replaced by a perfluoroalkoxy group,

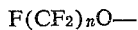

These acids may be referred to as perfluoro(beta-alkoxypropionic) acids to specifically indicate the structure. The intermediate oxygen atom is referred to as an "ether" oxygen atom because it links perfluoroalkyl groups in the chain. However, it does not confer "ether" properties as understood in conventional organic chemistry.

The perfluoro "ether" chain is both oleophobic and hydrophobic; and it is highly stable and inert. The acid molecules and related carbonyl molecules are quite stable, although not as much so as the perfluoroalkyl monocarboxylic acid molecules and related carbonyl molecules. We have discovered that our compounds are sufficiently stable for many uses and for the making of many derivatives by methods previously used for making corresponding derivatives of the perfluoroalkyl acids (cf. U. S. Patent No. 2,567,011).

The oxygen atom in the chain modifies the properties in a way that is desirable for certain uses. Of particular interest is the fact that it permits of rotation and flexibility of the fluorocarbon chain, which is a desirable feature of polymerizable monomer derivatives in that it makes possible the obtaining of highly fluorinated polymers having improved flexibility at low temperatures as well as good stability at elevated temperatures. Also of particular interest is the fact that the oxygen atom lowers the refractive index, thereby permitting of obtaining compounds and polymer products of exceptionally low refractive index.

The present acids and salts are soluble in water and markedly reduce the surface tension; the higher members of the series being only slightly soluble and markedly reducing surface tension even when present in concentrations of less than 1%. These compounds have utility as surface active agents.

The following table gives the approximate boiling points (at 740 mm.) of our acids, which have the generic formula:

The formulas in the table are given in an abbreviated form.

| Alkoxy Group | Acid Formula | B. P. (° C.) |
| --- | --- | --- |
| methoxy | $CF_3OC_2F_4COOH$ | 126 |
| ethoxy | $C_2F_5OC_2F_4COOH$ | 136 |
| propoxy | $n\text{-}C_3F_7OC_2F_4COOH$ | 152 |
| butoxy | $n\text{-}C_4F_9OC_2F_4COOH$ | 168 |
| pentoxy | $n\text{-}C_5F_{11}OC_2F_4COOH$ | 184 |
| hexoxy | $n\text{-}C_6F_{13}OC_2F_4COOH$ | 198 |
| heptoxy | $n\text{-}C_7F_{15}OC_2F_4COOH$ | 212 |
| octoxy | $n\text{-}C_8F_{17}OC_2F_4COOH$ | 225 |

The first four acids of the series have been obtained in sufficient purity to provide reasonably accurate refractive index values. The formulas and values at 25° C. are listed below in the left-hand columns. The right-hand columns give the formulas and refractive indices of the corresponding fluorocarbon acids containing the same number of carbon atoms but which do not contain an ether-oxygen atom; these values are higher and thus demonstrate the effect of the ether-oxygen atom in lowering the refractive index.

| | $n_D^{25}$ | | $n_D^{25}$ |
| --- | --- | --- | --- |
| $CF_3OC_2F_4COOH$ | 1.286 | $n\text{-}C_3F_7COOH$ | 1.290 |
| $C_2F_5OC_2F_4COOH$ | 1.283 | $n\text{-}C_4F_9COOH$ | 1.295 |
| $n\text{-}C_3F_7OC_2F_4COOH$ | 1.286 | $n\text{-}C_5F_{11}COOH$ | 1.298 |
| $n\text{-}C_4F_9OC_2F_4COOH$ | 1.290 | $n\text{-}C_6F_{13}COOH$ | 1.302 |

Our acids in anhydrous form decompose thermally at 350–400° C.; the anhydrous sodium salts at about 250° C. Stability of the acids in base solutions is illustrated by the fact that the $CF_3OC_2F_4COOH$ acid did not appreciably decompose when refluxed with 100% excess of 0.5 N NaOH for 12 hours; the product being the sodium salt in high yield.

Our acids can be made by hydrolyzing the corresponding acid fluoride (acyl fluoride) compounds:

and derivatives thereof, such as the salts.

The acids are strong salt-forming acids and can be readily reacted with metals, metal oxides carbonates or hydroxides, or with ammonium hydroxide, in water or in an inert reaction solvent, to yield the corresponding metal and ammonium salts of the acids:

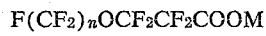

wherein "M" stands for the metal atom or ammonium group, and in the case of a polyvalent metal may be joined to more than one carboxyl groups.

A variety of salts of the methoxy acid $$(CF_3OC_2F_4COOH)$$

were prepared, vacuum dried at 80–90° C., and were heated to elevated temperatures to determine stability. All were found to be stable at temperatures up to at least about 200° C. The alkali-metal salts were white crystalline solids, as were the silver and lead salts. The zinc and cadmium salt products, even after vacuum drying at 80–90° C., were transparent viscous liquids. The magnesium salt was a light-brown low-melting solid. The copper salt product, even after vacuum drying at 80–90° C., was a blue-green highly-viscous liquid, which decomposed at 280–320° C. The manganese salt was a light pink solid, which decomposed at 250–280° C. Analysis of the zinc, cadmium, magnesium, lead and manganese salts showed that in each case the molecule contained two carboxyl groups:

$$(CF_3OC_2F_4COO)_2M$$

The acids can be reacted with phosphorous pentachloride or benzoyl chloride or phthayly dichloride to produce the corresponding acid chlorides; and these can be used for making the corresponding acid bromides and iodides by replacement of the chlorine with bromine or iodine, as by reacting with calcium bromide or iodide, respectively. The acid chlorides, bromides and iodides have the formulas:

$$F(CF_2)_nOCF_2CF_2COCl$$
$$F(CF_2)_nOCF_2CF_2COBr$$
$$F(CF_2)_nOCF_2CF_2COI$$

The acid chloride compounds react with alcohols to form the corresponding esters (primary, secondary and tertiary) which contain the alkyl group of the alcohol. The acids can be reacted with primary alcohols to yield the primary esters. These esters have the formula:

$$F(CF_2)_nOCF_2CF_2COOR$$

where "R" is the alkyl group.

Examples of other derivatives are the 1,1-dihydroalcohols (by reduction of the methyl or ethyl esters), the amides (by reaction of the esters with ammonia or amines), the nitriles (by dehydration of the amides), the 1,1-dihydroamines (by reduction of the nitriles), and the acrylamides and methacrylamides (by reaction of the 1,1-dihydroamines with acrylyl chloride or methacrylyl chloride, respectively).

The key to the preparation of these compounds is our discovery that the aforesaid fluorocarbon acid fluoride compounds, perfluoro(alkoxypropionyl) fluorides, can be obtained in useful yields from the corresponding hydrocarbon alkoxypropionyl fluorides and chlorides by dissolving the latter in anhydrous liquid hydrogen fluoride and electrolyzing the solution. The desired product molecule has the same skeletal structure as the starting compound, but the hydrogen atoms have been replaced by fluorine atoms, as also the chlorine atom when an acid chloride starting compound is used. The perfluorinated acid fluoride product is insoluble in liquid hydrogen fluoride and will either evolve in admixture with the hydrogen and other cell gases or will settle to the bottom of the cell in admixture with by-products, depending on the volatility of the particular compound and the operating conditions. It can be recovered from the mixture by fractional distillation. It need not be recovered as such but can be recovered by treatment of a cell mixture containing it to provide a derivative (as by alkaline hydrolysis to produce a salt), which can be recovered, or a mixture containing this derivative can be processed to provide a further derivative (as by distilling the acid from a salt mixture in concentrated sulfuric acid), which is recovered.

The equipment and operating procedures used in the electrochemical fluorination process have been described in the aforesaid U. S. Patent No. 2,567,011. Photographs of a 50-ampere laboratory cell and of a 2000-ampere pilot plant cell appear on pages 417–418 of the book "Fluorine Chemistry," edited by J. H. Simons (published by Academic Press, Inc., New York, 1950).

A 50-ampere cell is adequate for the production of substantial quantities of product compounds for study, evaluation and limited usage. The electrode pack comprises an alternating assemblage of iron plates as cathodes and nickel plates as anodes, spaced apart a distance of ⅛ to ¼", the total effective anode surface area being about 350 sq. in. (2.43 sq. ft.). The cell is normally operated at atmospheric pressure and a temperature in the neighborhood of 0 to 20° C., provision being made for cooling the cell during operation. The applied D. C. cell voltage is in the range of 4 to 6 volts. The conductivity of the electrolyte solution can be increased by adding a carrier electrolyte (conductivity additive), such as sodium fluoride or acetic anhydride, but this is not usually necessary.

The following table lists the approximate boiling points of the acid fluorides (at 740 mm.) and will serve as a guide to the recovery of these compounds by fractional distillation of cell product mixtures.

| Formula | B. P. (° C.) |
|---|---|
| $CF_3OC_2F_4COF$ | 14 |
| $C_2F_5OC_2F_4COF$ | 35 |
| $n\text{-}C_3F_7OC_2F_4COF$ | 59 |
| $n\text{-}C_4F_9OC_2F_4COF$ | 82 |
| $n\text{-}C_5F_{11}OC_2F_4COF$ | 105 |
| $n\text{-}C_6F_{13}OC_2F_4COF$ | 127 |
| $n\text{-}C_7F_{15}OC_2F_4COF$ | 148 |
| $n\text{-}C_8F_{17}OC_2F_4COF$ | 170 |

Example 1

This experiment serves to illustrate the preparation of perfluoro(ethoxypropionic) acid and also serves as a guide to the preparation of the other members of the series since the procedure is similar.

Crude beta-ethoxypropionic acid $$C_2H_5OCH_2CH_2COOH,$$

was vacuum-fractionated to yield the substantially pure acid (B. P. 111° C. at 9 mm., $n_D^{25}$ 1.4181). This was refluxed with thionyl chloride and distilled in 98% yield to provide the acid chloride derivative, beta-ethoxypropionyl chloride, $C_2H_5OCH_2CH_2COCl$ (B. P. 144–147° C. at 740 mm., $n_D^{25}$ 1.4117).

A 50-ampere cell of the type described above was charged with 2,000 grams of anhydrous liquid hydrogen fluoride and 120 grams of beta-ethoxypropionyl chloride, the initial organic concentration thus being 6%. Hydrogen fluoride and the organic starting compound were charged periodically as make-up. The cell was operated at 5.5–6 volts. The temperature was 20° C. and the pressure substantially atmospheric.

The gas mixture from the cell (after condensation of HF that was drained back to the cell, and passage over NaF to remove residual HF), and the cell drainings, were fractionally distilled to recover the desired perfluoro(ethoxypropionyl) fluoride product compound, $C_2F_5OCF_2CF_2COF$, the crude fraction having a boiling range of 30–35° C. (The volatility of this compound is such that some of it was evolved with the cell gases and some of it settled to the bottom of the cell.) This acid fluoride fraction was dissolved in aqueous 20% NaOH in amount to cause neutralization, resulting in hydrolysis of the acid fluoride compound and formation of the corresponding sodium salt. To this solution was added sufficient lime to neutralize the hydrogen fluoride present in the mixture, and the resultant calcium fluoride precipitate was removed by filtration. To the solution was then added a 50% molar excess of aqueous 20%

NaOH, and the mixture was refluxed for 4 hours to decompose unstable by-product compounds present as impurities. The excess base was neutralized with sulfuric acid and the mixture evaporated to dryness, resulting in a dry mixture of the sodium salt of the perfluoro acid and sodium sulfate. This salt mixture was added to concentrated sulfuric acid to hydrolyze the perfluoro salt, and the perfluoro acid was distilled off and fractionated, resulting in a substantial yield of the desired perfluoro(ethoxypropionic) acid $$C_2F_5OC_2F_4COOH$$

having a boiling point of 136° C. (at 740 mm.), a refractive index at 25° C. of 1.283, and a neutral equivalent value of 277 (theoretical 280).

In the foregoing procedure, KOH can be used in place of NaOH for making the intermediate acid salts and for refluxing to decompose unstable impurities.

*Example 2*

The perfluoro(methoxypropionic) acid was prepared in a similar manner. The beta-methoxypropionyl chloride starting compound, $CH_3OCH_2CH_2COCl$, had a boiling point of 63–65° C. at 45 mm. and an $n_D^{25}$ value of 1.4278. The desired perfluoro(methoxypropionyl) fluoride product compound, $CF_3OCF_2CF_2COF$, was evolved almost entirely as a component of the gas mixture from the cell, due to its volatility. The gas stream (after condensation of HF and passage over NaF) was passed through a bubbler containing distilled water and then through a bubbler containing aqueous 5% KOH, both at room temperature, which absorbed the acid fluoride compound. The solutions were combined and KOH was added until the mixture was just slightly acidic, followed by mixing with lime to precipitate out the HF as $CaF_2$, which was removed by filtration. The solution was refluxed with a 50% molar excess of KOH for 5 hours, neutralized with sulfuric acid and then made slightly basic, evaporated to dryness and then oven-dried. The dry salt mixture was added to 100% sulfuric acid (1 ml. of sulfuric acid per gram of salt), and the desired perfluoro acid was distilled off and then purified by fractionation. This perfluoro(methoxypropionic) acid product had a boiling point of 126° C. (at 740 mm.) and a refractive index (at 25° C.) of 1.286.

*Example 3*

This experiment illustrates the preparation of alkyl esters of our acids.

A flask cooled in an ice bath was charged with 63 grams (1.96 moles) of analytical grade methyl alcohol. When the alcohol was cooled, addition was made of 144 grams (1.47 moles) of concentrated sulfuric acid at such a rate that the temperature of the reaction mixture did not exceed 25° C. Then addition was made of 226 grams (0.981 mole) of perfluoro(methoxypropionic) acid, $CF_3OC_2F_4COOH$, and the mixture was allowed to stand for 30 minutes. The mixture was then charged to a fractionating still and rapidly distilled. The crude ester was collected at a boiling range of 80–84° C. (740 mm. pressure) and amounted to 240 grams. To this ester fraction was added 10 grams of $P_2O_5$ and the mixture was carefully redistilled in a column of 20–30 theoretical plates. The purified ester (B. P. 83–84° C. at 740 mm.) was recovered in a yield of 228 grams (94.5%).

The following table gives boiling point (at 740 mm.) and refractive index value for various methyl and ethyl esters:

|  | B. P. °C. | $n_D$ |
|---|---|---|
| $CF_3OC_2F_4COOCH_3$ | 84 | 1.286 (27° C.) |
| $n\text{-}C_3F_7OC_2F_4COOCH_3$ | 115 | 1.287 (25° C.) |
| $n\text{-}C_4F_9OC_2F_4COOCH_3$ | 133 | 1.291 (25° C.) |
| $C_2F_5OC_2F_4COOC_2H_5$ | 111 |  |
| $n\text{-}C_3F_7OC_2F_4COOC_2H_5$ | 128 | 1.294 (27° C.) |

An important use of the methyl and ethyl esters is as starting compounds for making the corresponding 1,1-dihydroperfluoro(alkoxypropyl) alcohols by reduction, as by using lithium aluminum hydride as reduction agent:

$$F(CF_2)_nOCF_2CF_2COOR \xrightarrow{LiAlH_4} F(CF_2)_nOCF_2CF_2CH_2OH$$

These alcohols in turn can be employed as intermediates for making useful derivatives, as for instance the acrylate and methacrylate esters, which are polymerizable monomers. These alcohols and their acrylate esters, and rubbery polymers of the latter, are described in more detail in the companion application of F. A. Bovey and J. F. Abere, S. N. 399,568, filed of even date herewith (December 21, 1953).

*Example 4*

This experiment illustrates the preparation of the acid chloride derivatives.

The reaction vessel was a one-neck 100 ml. flask fitted with a reflux condenser. It was charged with 96 grams (0.343 mole) of the ethoxy acid, $C_2F_5OC_2F_4COOH$, 75 grams (0.37 mole) of phthalyl chloride, $C_6H_4(COCl)_2$, and 0.1 gram of zinc chloride, $ZnCl_2$. The mixture was heated at 55–60° C. for 2 hours and then at 60–70° C. for 5 hours. The desired acid chloride product was recovered in crude form by distillation at a boiling range of 40–75° C. and was purified by redistillation in a column of 20–30 theoretical plates. The yield was 59% (60 grams). Analysis confirmed the identification of the product as the acid chloride of the starting compound, perfluoro(ethoxypropionyl) chloride, $C_2F_5OC_2F_4COCl$. The boiling point was 64° C. (at 740 mm.).

We claim:

1. The new and useful fluorocarbon compounds of the class consisting of the normal perfluoro(alkoxypropionic) acids having the formula:

$$F(CF_2)_nOCF_2CF_2COOH$$

where $n$ has an integer value of 1 to 8; and the corresponding acid halides, metal and ammonium salts, and alkyl esters, thereof.

2. The perfluoro(methoxypropionic) acid having the formula:

$$CF_3OC_2F_4COOH$$

3. The perfluoro(ethoxypropionic) acid having the formula:

$$C_2F_5OC_2F_4COOH$$

4. The normal perfluoro(propoxypropionic) acid having the formula:

$$n\text{-}C_3F_7OC_2F_4COOH$$

5. The normal perfluoro(butoxypropionic) acid having the formula:

$$n\text{-}C_4F_9OC_2F_4COOH$$

6. The normal perfluoro(pentoxypropionic) acid having the formula:

$$n\text{-}C_5F_{11}OC_2F_4COOH$$

No references cited.